United States Patent [19]
Black et al.

[11] 3,821,363
[45] June 28, 1974

[54] SUNSCREEN PREPARATION EMPLOYING ETHYLENE-MALEIC ANHYDRIDE COPOLYMERS

[76] Inventors: Archie Scott Black, 1323 Broadmoor St., Memphis, Tenn. 38111; Wolffe Harry Feinstone, 3022 Jackson Ave., Memphis, Tenn. 38103

[22] Filed: Jan. 21, 1971

[21] Appl. No.: 108,610

Related U.S. Application Data
[63] Continuation of Ser. No. 587,968, Oct. 20, 1966, abandoned.

[52] U.S. Cl.................................. 424/59, 424/60
[51] Int. Cl................................................ A61k 9/06
[58] Field of Search......................... 424/59, 60, 78

[56] References Cited
UNITED STATES PATENTS

| | | | |
|---|---|---|---|
| 2,792,328 | 5/1957 | Socec | 424/59 |
| 3,083,189 | 3/1963 | Reinhard | 424/78 |
| 3,341,419 | 9/1967 | Elermann et al. | 424/59 |

OTHER PUBLICATIONS

Holzner, Chem. Abstracts, Vol. 60 (1964) p. 1,535f.

*Primary Examiner*—Albert T. Meyers
*Assistant Examiner*—Vincent D. Turner
*Attorney, Agent, or Firm*—Bruce M. Eisen; Stephen B. Coan

[57] ABSTRACT

A gel of the acid form of a cross-linked co-polymer of ethylene-maleic anhydride of the character sold commercially as EMA-91, a sunscreen agent and sufficient of an alkaline reactant compatible with the co-polymer and sunscreen agent to produce a pH in the range of about 5 to 8. The gel vehicle can be water or water and water-miscible alcohol.

1 Claim, No Drawings

SUNSCREEN PREPARATION EMPLOYING ETHYLENE-MALEIC ANHYDRIDE COPOLYMERS

This application is a continuation of Ser. No. 587,968 filed Oct. 20, 1966, now abandoned.

BACKGROUND OF THE INVENTION

There is and long has been a recognized need for a sunburn protective preparation which is long-lasting, resistant to removal by water, which produces no noticeable shine, and which is not greasy or sticky, for use not only by bathers and sun addicts, but by linemen, military personnel, construction workers and others whose occupations make it necessary to be exposed to the actinic rays of the sun. The term "sunburn protective preparation" is used herein to embrace both those preparations which screen much of the ultraviolet rays from sunlight but permit tanning, and those which act to block so much of the ultraviolet sunlight as practically to preclude tanning, for those who are unusually sensitive to sunlight. Sunburn protective products which have been known heretofore are oils, ointments, greases, creams, cream lotions or alcoholic lotions. Except for the alcoholic lotions, these products have left a greasy and sticky film which rubs off easily on clothing, furniture, or whatever comes in contact with the treated areas of the body. They are likely to be shiny, and to collect dirt and sand, and, coming in contact with the hands, to interfere with the use of the hands. With the exception of very heavy, thick greases, such as red veterinary petrolatum, the suntan or sunblock products, or at least the active sunscreen agents in them, have been easily removed by water so that new applications of the product are required after one has become wet. People who remain in the water outdoors for some time may become sunburned because of the loss of the protective sunscreen agent, and the water in swimming pools is frequently contaminated with sunburn protective products, washed from the body.

Although the alcoholic suntan lotions do not leave an oily or sticky film on the skin, they are difficult to apply evenly, produce very thin films so that several applications are necessary to provide adequate protection from the sunlight and are easily removed with water.

One of the objects of this invention is to provide a topical sunburn protective preparation which provides protection from actinic rays and permits tanning, but which is easily applied to the skin in a smooth even coating, dries quickly to form a non-oily, non sticky film which is resistant to removal by abrasion, perspiration and water, produces no shine, and lasts longer in use than suntan products known heretofore.

Another object of this invention is to provide preparations that are so effective as to give very high protection from the effects of sunlight to individuals whose skins are especially sensitive to such light, or to individuals who, because of their activities or work, undergo long periods of exposure to sunlight and require extraordinary protection, and yet, unlike oily or thick, greasy preparations, are un-objectionable for wearing for long periods.

SUMMARY OF THE INVENTION

In accordance with this invention, generally stated, a sunburn protective preparation is provided in the form of a gel, which is substantially free from any emulsifying agent or surfactant, which has a viscosity and body which are attractive and enable the user to apply the preparation smoothly and in an even, continuous coat, which dries rapidly and leaves a practically invisible, dry, non-oily, non-sticky film which has remarkable substantivity or endurance. The substantivity of a sunburn protective product may be determined by spectrophotometric measurement of the sunscreen agent in solvent washings of comparable areas of treated skin before and after exposure to water under controlled conditions. By such a test, losses of 70 to 90 percent occur with commercial preparations now in use, as compared to less than 15 percent with the gels prepared in accordance with this invention.

The sunburn protective preparations of this invention all contain some sunscreen agent compatible with the gel, effective in low concentrations and preferably difficultly soluble in water. Suitable sunscreen agents include esters of paraamino-benzoic acid, e.g., the glyceryl ester, esters of substituted para-amino benzoic acid, e.g., amyl, isoamyl, or ethyl esters of para dimethyl aminobenzoic acid, the ethyl ester of para diethyl aminobenzoic acid and esters of paramethoxy-cinnamic acid, e.g., 2 ethoxy-ethyl ester. These sunscreen agents may be used in aqueous-alcoholic or aqueous gels. Certain esters of salicylic acid, e.g., homomenthyl salicylate, and certain benzophenone derivatives, e.g., 2-hydroxy-4-methoxy-benzophenone and 2, 2-dihydroxy-4-methoxy benzophenone, may be used in aqueous gels.

The sunburn protective preparations of this invention may contain emollients, e.g., diisopropyl adipate and lauryl lactate, and moisturizing agents such as propylene glycol, glycerol or polyglycols.

The sunburn protective preparations of this invention can also be made with an insect repelling component, e.g., meta diethyl toluamide, or with the tanning agent, dihydroxy-acetone. When the latter is used, the gel must have a pH below 5 and must not contain any substance with an active amino group, an amine or ammonia. Esters of substituted para aminobenzoic acid, cinnamic acid or salicyclic acid are suitable sunscreen agents for use in such a preparation.

The preparations of this invention can be made clear, in which case they are made with an aqueous-alcoholic solution, or they can be made substantially opaque, when they are made with water alone as the vehicle. The alcohol used in the aqueous-alcoholic solution may be any water-miscible alcohol. The gels of the product of this invention are preferably made with cross-linked co-polymers of ethylene-maleic anhydride, suitable commercially available forms of which are sold by Monsanto Company under the trademark EMA, as EMA-61, EMA-71, EMA-81, and EMA-91. The molecular weights of these commercial products are all high but increase with the higher numbers. The EMA co-polymers are considered to have the following formulae:

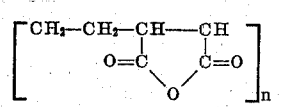

Anhydride

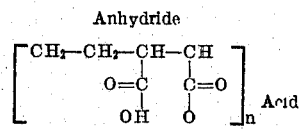

Acid

The cross-linking of the EMA co-polymers is accomplished by reacting across the ethylene backbone (Monsanto Technical Bulletin 1-261, "EMA*," page 4). They are available commercially in the form of dry powdered anhydrides, which, in compounding the preparations are suspended in water and converted to the acids, preferably with the aid of heat to hasten completion of the reaction. The resulting solutions are acidic, having a pH of 1.5 to 2.5. The pH is then adjusted to the range of 5–6, to conform to the normal skin condition by adding an alkali such as sodium, potassium or ammonium hydroxide or an amine such as triethanolamine. When an amine is used the pH of the alcoholic clear gel may be adjusted to at least 7.6. With the opaque aqueous gels, the pH may be adjusted to at least 8 with any of the above alkalis. The addition of the alkali increases the viscosity of the gel. The viscosity of the gel can be controlled within limits by adjusting the amount of the co-polymers. Co-polymers with the higher molecular weights produce a more viscous solution. The viscosity of EMA–61, EMA–71, EMA–81 and EMA–91, in 2 percent aqueous solution, measured at normal product pH, is 100 Cps, 960 Cps, 1,100 Cps and 8,500 Cps, respectively.

As has been indicated, when the gel contains 45 to 55 percent alcohol by weight (50 to 65 percent by volume), the gel is clear and transparent. When the gel contains little or no alcohol, it becomes substantially opaque. Both types of gels are stable, and have a long shelf-life.

The Monsanto Technical Bulletin to which reference has been made indicates that although uses for the EMA compounds have been sought since at least as long ago as 1952 U.S. Pat. No. 2,817,128, page 19 of the bulletin) and although a cosmetic preparation (hair spray) has been patented and EMA–91 used in shampoos and hair sets (id. pp. 16 and 19), its use to form a lotion-like preparation to be applied to and remain on the skin has not heretofore been suggested.

DESCRIPTION OF PREFERRED EMBODIMENTS

The following examples are merely illustrative of preparations of the invention.

EXAMPLE 1

Part 1
Ethylene-maleic Anhydride Co-polymer 91 — 0.7 g
Water — 35.0 g
Part 2
Sodium Hydroxide 10% solution — 1.0 g
Part 3
Water q.s. — 45.0 g
Part 4
Amyl p-dimethylamino benzoate — 2.0 g
Alcohol SD39C Anhydrous — 53.0 g
Total — 100.0 g The co-polymer is suspended in water preferably warm. The mixture is heated on a steam bath (90°–95°C) with stirring until a thin translucent gel results (15–30 min.) when the anhydride is converted to the acid. The gel is cooled to room temperature.

The sodium hydroxide solution Part 2 and the additional water Part 3 are added with stirring. A clear thick gel results.

The components of Part 4 are combined and slowly added to the gel with stirring until completely blended. A clear viscous gel results.

EXAMPLE 2

Part 1
Ethylene-maleic anhydride co-polymer 91 — 4.0 g
Methylparaben — 0.5 g
Water — 150.0 cc
Part 2
Water q.s. — 175.25
Part 3
Amyl p-dimethylamino benzoate — 8.75 g
Diisopropyl adipate — 25.0 g
Propylene glycol — 10.0 g
Perfume — 1.0 g
Alcohol SD39C Anhydrous — 265.0 g
Part 4
Sodium Hydroxide 5% Solution — 15.0 g
Total — 500.0 g The co-polymer is suspended in water, preferably warm and heated on a steam bath with stirring until a thin translucent gel results (15–30 minutes) when the anhydride is converted to the acid. The gel is cooled to room temperature and the weight is adjusted by addition of water Part 2.

The ingredients of Part 3 are combined, mixed and added slowly to the gel with stirring.

The sodium hydroxide solution is added with stirring. A clear viscous gel results.

EXAMPLE 3

Part 1
Ethylene-maleic anhydride Co-polymer 91 — 0.7 g
Methylparaben — 0.2 g
Propylene glycol — 2.0 g
Water — 35.0 cc
Part 2
Water q.s. — 42.0 g
Part 3
Glyceryl p-amino benzoate — 2.0 g
Alcohol SD39C Anhydrous — 55.0 g
Part 4
Sodium Hydroxide 10% Solution — 1.0 g
Total — 100.0 g The gel is prepared by the procedure described for Example 2. A clear viscous gel results.

EXAMPLE 4

Part 1
Ethylene-maleic anhydride Co-polymer 91 — 1.0 g
Water — 30.0 cc
Part 2
Water q.s. — 37.8 g
Part 3
2 Ethoxyethyl p-methoxy cinnamate — 2.0 g
Diisopropyl adipate — 5.0 g
Propylene Glycol — 2.0 g
Perfume — 0.2 g
Alcohol SD39C Anhydrous — 50.0 g
Part 4
Sodium Hydroxide 5% Solution — 3.0 g
Total — 100.0 g The gel is prepared by the procedure described for Example 2. A clear viscous gel results.

EXAMPLE 5

Part 1
Ethylene-maleic anhydride Co-polymer 91 — 1.0 g
Water — 30.0 cc
Part 2
Water q.s. — 38.3 g —Continued Part 3
| | |
|---|---|
| Ethyl p-dimethylamino benzoate | 1.5 g |
| Diisopropyl adipate | 5.0 g |
| Propylene glycol | 2.0 g |
| Perfume | 0.2 g |
| Alcohol SD39C Anhydrous | 50.0 g |

Part 4
| | |
|---|---|
| Sodium Hydroxide 5% Solution | 3.0 g |
| Total | 100.0 g |

The gel is prepared by the method described for Example 2. A clear viscous gel results.

The gel of the following example is prepared in the same way.

EXAMPLE 6

Part 1
| | |
|---|---|
| Ethylene-maleic anhydride Co-polymer 91 | 1.0 g |
| Water | 30.0 cc |

Part 2
| | | |
|---|---|---|
| Water | q.s. | 38.3 g |

Part 3
| | |
|---|---|
| Ethyl p-diethylamino benzoate | 1.5 g |
| Diisopropyl Adipate | 5.0 g |
| Propylene Glycol | 2.0 g |
| Perfume | 0.2 g |
| Alcohol SD39C Anhydrous | 50.0 g |

Part 4
| | |
|---|---|
| Sodium Hydroxide 5% | 3.0 g |
| Total | 100.0 g |

Example 7

Part 1
| | |
|---|---|
| Ethylene-maleic anhydride Co-polymer 91 | 1.0 g |
| Water | 30.0 cc |

Part 2
| | | |
|---|---|---|
| Water | q.s. | 38.05 |

Part 3
| | |
|---|---|
| Amyl p-dimethylamino benzoate | 1.75 g |
| Lauryl lactate | 5.0 g |
| Propylene Glycol | 2.0 g |
| Perfume | 0.2 g |
| Alcohol SD39C Anhydrous | 50.0 g |

Part 4
| | |
|---|---|
| Sodium hydroxide 5% Solution | 3.0 g |
| Total | 100.0 g |

The gel is prepared by the method described for Example 2. A clear viscous gel results.

EXAMPLE 8

Part 1
| | |
|---|---|
| Ethylene maleic anhydride Co-polymer 91 | 1.0 g |
| Water | 30.0 cc |

Part 2
| | | |
|---|---|---|
| Water | q.s. | 38.05 g |

Part 3
| | |
|---|---|
| Amyl p-dimethylamino benzoate | 1.75 g |
| Myristyl lactate | 5.0 g |
| Propylene glycol | 2.0 g |
| Perfume | 0.2 g |
| Alcohol SD39C Anhydrous | 50.0 g |

Part 4
| | |
|---|---|
| Sodium hydroxide 5% Solution | 3.0 g |
| Total | 100.0 g |

The gel is prepared by the method which is described for Example 2. A clear viscous gel results.

EXAMPLE 9

Part 1
| | |
|---|---|
| Ethylene-maleic Anhydride Co-polymer 71 | 2.0 g |
| Water | 30.0 cc |

Part 2
| | | |
|---|---|---|
| Water | q.s. | 37.3 g |

Part 3
| | |
|---|---|
| Amyl p-dimethylamino benzoate | 1.5 g |
| Diisopropyl adipate | 5.0 g |
| Propylene glycol | 2.0 g |
| Perfume | 0.2 g |
| Alcohol SD39C Anhydrous | 50.0 g |

Part 4
| | |
|---|---|
| Sodium hydroxide 5% Solution | 4.0 g |
| Total | 100.0 g |

The gel is prepared by the method which is described in Example 2. A near clear viscous gel results.

EXAMPLE 10

Part 1
| | |
|---|---|
| Ethylene-maleic anhydride Co-polymer 81 | 2.0 g |
| Water | 30.0 cc |

Part 2
| | | |
|---|---|---|
| Water | q.s. | 37.3 g |

Part 3
| | |
|---|---|
| Amyl p-dimethylamino benzoate | 1.5 g |
| Diisopropyl adipate | 5.0 g |
| Propylene Glycol | 2.0 g |
| Perfume | 0.2 g |
| Alcohol SD39C Anhydrous | 50.0 g |

Part 4
| | |
|---|---|
| Sodium hydroxide 5% Solution | 4.0 g |
| Total | 100.0 g |

The gel is prepared by the method described for Example 2. A clear very viscous gel results.

EXAMPLE 11

Part 1
| | |
|---|---|
| Ethylene-maleic Anhydride Co-polymer 91 | 1.0 g. |
| Water | 25.0 cc |

Part 2
| | | |
|---|---|---|
| Water | q.s. | 33.3 g. |

Part 3
| | |
|---|---|
| Amyl p-dimethylamino benzoate | 1.5 g. |
| Di-isopropyl adipate | 5.0 g. |
| Propylene Glycol | 2.0 g. |
| Perfume | 0.2 g. |
| Alcohol SDA 39C anhydrous | 50.0 g. |

Part 4
| | |
|---|---|
| Triethanolamine 18.5% solution | 8.0 g. |
| Total | 100.0 g. |

This gel is prepared by the method which is described for Example 2. A clear viscous gel results.

EXAMPLE 12

Part 1
| | |
|---|---|
| Ethylene-maleic anhydride Co-polymer 91 | 1.0 g |
| Water | 30.0 cc |

Part 2
| | | |
|---|---|---|
| Water | q.s. | 39.3 g |

Part 3
| | |
|---|---|
| Amyl p-dimethylamino benzoate | 1.5 g |
| Diisopropyl adipate | 5.0 g |
| Propylene Glycol | 2.0 g |
| Perfume | 0.2 g |
| Alcohol SD39C Anhydrous | 50.0 g |

Part 4
| | |
|---|---|
| Potassium hydroxide 7% | 2.0 cc |
| Total | 100.0 g |

The gel is prepared by the method which is described for Example 2. A clear viscous gel results.

EXAMPLE 13

Part 1
| | |
|---|---|
| Ethylene-maleic anhydride Co-polymer 91 | 1.0 g |
| Water | 30.0 cc |

Part 2
| | | |
|---|---|---|
| Water | q.s. | 39.3 g |

—Continued

Part 3

| | |
|---|---|
| Amyl p-dimethylamino benzoate | 1.5 g |
| Diisopropyl adipate | 5.0 g |
| Propylene glycol | 2.0 g |
| Perfume | 0.2 g |
| Alcohol SD39C Anhydrous | 50.0 g |

Part 4

| | |
|---|---|
| Ammonium hydroxide Solution (2.13% NH$_3$) | 2.0 g |
| Total | 100.0 g |

The gel is prepared by the method which is described for Example 2. A clear viscous gel results.

EXAMPLE 14

Part 1

| | |
|---|---|
| Ethylene-maleic anhydride Co-polymer 91 | 1.0 g |
| Water | 30.0 cc |

Part 2

| | |
|---|---|
| Water q.s. | 39.3 g |

Part 3

| | |
|---|---|
| Amyl p-dimethylamino benzoate | 1.5 g |
| Diisopropyl adipate | 5.0 g |
| Propylene glycol | 2.0 g |
| Perfume | 0.2 g |
| Alcohol SD39C Anhydrous | 50.0 g |

Part 4

| | |
|---|---|
| Triethanolamine 18.5% Solution | 2.0 g |
| Total | 100.0 g |

The gel is prepared by the method described for Example 2. A clear viscous gel results.

EXAMPLE 15

Part 1

| | |
|---|---|
| Ethylene-maleic anhydride Co-polymer 91 | 68.0 g |
| Water | 2000.0 cc |

Part 2

| | |
|---|---|
| Water q.s. | 2300.0 cc |

Part 3

| | |
|---|---|
| Amyl p-dimethylamino benzoate | 110.0 g |
| Diisopropyl adipate | 340.0 g |
| Propylene glycol | 136.0 g |
| Perfume | 13.6 g |
| Alcohol SD39B 95% | 4550.0 cc |

Part 4

| | |
|---|---|
| Color concentrate (Caramel) | 5.4 g |

Part 5

| | |
|---|---|
| Sodium hydroxide 5% Solution | 270.0 cc |
| Total 2 gal. (7560 cc or 6800 g) | |

The gel is prepared by the method described for Example 2. The caramel color was added before the sodium hydroxide with stirring. A clear, amber, viscous gel results.

EXAMPLE 16—Sunblock Gel

Part 1

| | |
|---|---|
| Ethylene-maleic anhydride Co-polymer 91 | 34.0 g |
| Water | 1150.0 cc |

Part 2

| | |
|---|---|
| Water q.s. | 1218.2 g |

Part 3

| | |
|---|---|
| Amyl p-dimethylamino benzoate | 102.0 g |
| Diisopropyl adipate | 170.0 g |
| Propylene glycol | 68.0 g |
| Perfume | 6.8 g |
| Alcohol SD39C Anhydrous | 2160.0 cc |

Part 4

| | |
|---|---|
| Sodium hydroxide 5% Solution | 135.0 cc |
| Total 1 gal. (3780 cc or 3400 g) | |

The gel is prepared by the method described for Example 2. It contains 3 percent sunscreen, amyl p-dimethylamino benzoate.

EXAMPLE 17 — Suntan-Insect Repellent Gel

Part 1

| | |
|---|---|
| Ethylene-maleic anhydride Co-polymer 91 | 1.3 g |
| Water | 20.0 cc |

Part 2

| | |
|---|---|
| Water q.s. | 26.0 g |

Part 3

| | |
|---|---|
| Amyl p-dimethylamino benzoate | 1.6 g |
| Meta-diethyl toluamide | 10.0 g |
| Diisopropyl adipate | 5.0 g |
| Perfume | 0.2 g |
| Alcohol SD39B 95% | 52.7 g |

Part 4

| | |
|---|---|
| Sodium hydroxide 5% Solution | 2.5 g |
| Total | 100.0 g |

The gel is prepared by the method described for Example 2. A clear viscous gel results.

EXAMPLE 18 — Suntan-Insect Repellent Gel

Part 1

| | |
|---|---|
| Ethylene-maleic anhydride Co-polymer 91 | 1.1 g. |
| Water | 25.0 cc. |

Part 2

| | |
|---|---|
| Water q.s. | 27.41 g. |

Part 3

| | |
|---|---|
| Amyl p-dimethylamino benzoate | 1.75 g. |
| Insect Repellent MGK5579* | 10.0 g. |
| Propylene Glycol | 2.0 g. |
| Perfume | 0.2 g. |
| Alcohol SDA 39B | 52.64 g. |

Part 4

| | |
|---|---|
| Di-isopropanolamine 16.6% solution | 6.00 g. |
| Total | 100.00 g. |

\* Insect Repellent MGK5579 contains:

| | |
|---|---|
| N, N Diethyl-meta toluamide | 40% |
| N-Octyl bicycloheptene dicarboxamide | 40% |
| 2, 3, 4, 5 Bix (Δbutylene) tetrahydrofurfural | 10% |
| Di-n-Propyl iso-cinchomeronate | 10% |

The gel is prepared by the method described for Example 2. A clear viscous gel results.

EXAMPLE 19—Suntan-dihydroxyacetone Quick Tanning Gel

Part 1

| | |
|---|---|
| Ethylene-maleic anhydride Co-polymer 91 | 6.0 g |
| Water | 150.0 cc |

Part 2

| | |
|---|---|
| Water q.s. | 161.6 g |

Part 3

| | |
|---|---|
| Amyl p-dimethylamino benzoate | 6.0 g |
| Diisopropyl adipate | 16.0 g |
| Propylene glycol | 8.0 g |
| Perfume | .8 g |
| Alcohol SD39C Anhydrous | 189.6 g |

Part 4

| | |
|---|---|
| Dihydroxyacetone | 14.0 g |

Part 5

| | |
|---|---|
| Sodium hydroxide 5% Solution | 4.0 g |
| Total | 400.0 g |

The gel is prepared by the method described for Example 2. The dihydroxyacetone is added to the gel before the sodium hydroxide with stirring unitl solution is complete. The near clear, viscous gel, pH 4.2 results.

EXAMPLE 20 — Opaque Suntan Gel

Part 1

| | |
|---|---|
| Ethylene-maleic anhydride Co-polymer 91 | 0.6 g. |
| Water | 50.0 cc. |

Part 2

| | |
|---|---|
| Propylene Glycol | 2.0 g. |
| Methylparaben | 0.17 g. |

-Continued

| | | |
|---|---|---|
| Propylparaben | 0.03 | g. |
| Part 3 | | |
| Water q.s. | 87.3 | g. |
| Part 4 | | |
| Homo-menthylsalicylate | 8.0 | g. |
| Perfume | 0.2 | g. |
| Part 5 | | |
| Sodium hydroxide 5% solution | 4.5 | g. |
| Total | 100.0 | g. |

The co-polymer is suspended in water. The mixture is heated to 90°–95°C with stirring until a translucent solution results (20–30 minutes). The solution is cooled to room temperature.

The parabens in Part 2 are dissolved in the propylene glycol and the solution is added to Part 1.

The weight of the mixture is adjusted by addition of water.

The ingredients in Part 4 are combined and mixed and the solution is slowly added to the gel with stirring. The sodium hydroxide solution is added slowly with vigorous stirring. The gel mixture is homogenized to give a white smooth viscous opaque gel.

EXAMPLE 21—Opaque Suntan Gel

| | | |
|---|---|---|
| Part 1 | | |
| Ethylene-maleic anhydride Co-polymer 91 | 0.6 | g. |
| Water | 50.0 | cc. |
| Part 2 | | |
| Propylene Glycol | 2.0 | g. |
| Methylparaben | 0.17 | g. |
| Propylparaben | 0.03 | g. |
| Part 3 | | |
| Water q.s. | 89.8 | g. |
| Part 4 | | |
| Amyl p-dimethylamino benzoate | 0.5 | g. |
| Homo-menthylsalicylate | 5.0 | g. |
| Perfume | 0.2 | g. |
| Part 5 | | |
| Sodium hydroxide 5% solution | 4.5 | g. |
| Total | 100.0 | g. |

The opaque gel is prepared by the method described for Example 20. A white viscous gel results.

EXAMPLE 22 — Opaque Sunblock Gel

| | | |
|---|---|---|
| Part 1 | | |
| Ethylene-maleic anhydride Co-polymer 91 | 0.6 | g. |
| Water | 50.0 | cc. |
| Part 2 | | |
| Propylene Glycol | 2.0 | g. |
| Methylparaben | 0.17 | g. |
| Propylparaben | 0.03 | g. |
| Part 3 | | |
| Water q.s. | 88.55 | g. |
| Part 4 | | |
| Amyl p-dimethylamino benzoate | 2.75 | g. |
| Homo-menthylsalicylate | 4.00 | g. |
| Perfume | 0.2 | g. |
| Part 5 | | |
| Sodium hydroxide 5% solution | 4.5 | g. |
| Total | 100. | g. |

The gel is prepared by the method described for Example 20. A white viscous gel results.

EXAMPLE 23 — Sunblock Opaque Gel

| | | |
|---|---|---|
| Part 1 | | |
| Ethylene-maleic anhydride Co-polymer 91 | 0.6 | g. |
| Water | 50.0 | cc. |
| Part 2 | | |
| Propylene Glycol | 2.0 | g. |
| Methylparaben | 0.17 | g. |
| Propylparaben | 0.03 | g. |
| Part 3 | | |
| Water q.s. | 81.0 | g. |
| Part 4 | | |
| Amyl p-dimethylamino benzoate | 0.5 | g. |
| Homo-menthylsalicylate | 8.0 | g. |
| 2-Hydroxy-4-methoxy-benzophenone | 3.0 | g. |
| 2, 2-Dihydroxy-4-Methoxy benzophenone | 3.0 | g. |
| Part 5 | | |
| Sodium Hydroxide 5% solution | 4.5 | g. |
| Total | 100.0 | g. |

The opaque gel is prepared by the method described for Example 20. Part 4 may be warmed to hasten solution. A light yellow viscous gel results.

We claim:

1. The method of providing protection for the skin of a human body from the actinic rays of the sun comprising applying to the skin smoothly and in an even, continuous coat a sunburn protective preparation which dries rapidly and leaves a practically invisible, dry, non-oily, non-sticky film which has remarkable substantivity or endurance, said sunburn protective preparation comprising a major proportion, sufficient to provide a film on the human body, of a gel, in a vehicle selected from the group consisting of water and an aqueous solution of watermiscible alcohol, of the acid form of a cross-linked co-polymer of ethylene-maleic anhydride having a viscosity, in a 2 percent aqueous solution having a pH of 1.5 to 2.5, of about 100 cps, 960 cps, 1,100 cps or 8,500 cps; and an effective amount of a sunscreen agent compatible with the gel, and sufficient of an alkaline reactant compatible with said co-polymer and sunscreen agent to produce a pH in the range of about 5 to 8.

\* \* \* \* \*